(12) United States Patent
Andersson

(10) Patent No.: US 10,543,540 B2
(45) Date of Patent: Jan. 28, 2020

(54) POWER TOOL

(71) Applicant: ATLAS COPCO INDUSTRIAL TECHNIQUE AB, Stockholm (SE)

(72) Inventor: Patrik Leander Andersson, Skogås (SE)

(73) Assignee: ATLAS COPCO INDUSTRIAL TECHNIQUE AB, Tokyo (JP)

(*) Notice: Subject to any disclaimer, the term of this patent is extended or adjusted under 35 U.S.C. 154(b) by 0 days.

(21) Appl. No.: 15/762,078

(22) PCT Filed: Sep. 15, 2016

(86) PCT No.: PCT/EP2016/071754
§ 371 (c)(1),
(2) Date: Mar. 21, 2018

(87) PCT Pub. No.: WO2017/050625
PCT Pub. Date: Mar. 30, 2017

(65) Prior Publication Data
US 2018/0272435 A1    Sep. 27, 2018

(30) Foreign Application Priority Data

Sep. 22, 2015 (SE) ...................................... 1551218

(51) Int. Cl.
B23B 51/06 (2006.01)
B23Q 11/10 (2006.01)

(52) U.S. Cl.
CPC .......... B23B 51/06 (2013.01); B23Q 11/1023 (2013.01); B23B 2231/365 (2013.01);
(Continued)

(58) Field of Classification Search
CPC ................ B23B 51/06; B23B 2231/24; B23B 2231/365; B23B 2260/126;
(Continued)

(56) References Cited

U.S. PATENT DOCUMENTS 4,611,814 A * 9/1986 Hiestand ............... B23B 31/001
279/111
7,192,228 B2 * 3/2007 Haenle .................. B23B 31/028
279/156
(Continued)

FOREIGN PATENT DOCUMENTS

DE       10331769 A1    2/2005
DE   102006016883 A1 * 10/2006 ........... B23B 31/005
(Continued)

OTHER PUBLICATIONS

Machine Translation, German Patent Document, DE102006016883, Pfau C., et al., Oct. 5, 2006. (Year: 2006).*
(Continued)

Primary Examiner — Eric A. Gates
Assistant Examiner — Chwen-Wei Su
(74) Attorney, Agent, or Firm — Holtz, Holtz & Volek PC

(57) ABSTRACT

A spindle of a drilling tool includes a socket portion having a first axial length (a1) of a first diameter (d1) for receiving and attaching a drill bit to the spindle. The spindle includes a fluid conduit having a second diameter (d2) narrower than (d1) for conveying a fluid to the socket portion. An interface space with diameter (d1) is formed between the fluid conduit and the drill bit when the drill bit is installed in the socket portion. A fluid conveyor, having a third diameter (d3) narrower than (d1), connects the fluid conduit to the drill bit to avoid fluid gathering in a periphery of the interface space. The fluid conveyor includes a first O-ring abutting a mouth of the fluid conduit, a second O-ring abutting a mouth of a fluid channel of the drill bit, and a spring between the first and second O-rings.

20 Claims, 5 Drawing Sheets

(52) U.S. Cl.
CPC ..... *B23B 2250/12* (2013.01); *B23B 2260/126* (2013.01); *B23B 2260/136* (2013.01)

(58) Field of Classification Search
CPC ............ B23B 2250/12; B23Q 11/1023; Y10T 279/17111; Y10T 408/45; Y10T 408/455
See application file for complete search history.

(56) References Cited

U.S. PATENT DOCUMENTS

| | | | |
|---|---|---|---|
| 7,896,591 B2* | 3/2011 | Stoll | B23B 31/1179 |
| | | | 409/136 |
| 9,757,804 B2* | 9/2017 | Bridge | B23B 27/10 |
| 2006/0029480 A1 | 2/2006 | Stoll et al. | |
| 2007/0014647 A1* | 1/2007 | Watzke | B23B 31/02 |
| | | | 409/136 |
| 2013/0115023 A1* | 5/2013 | Haimer | B23C 5/26 |
| | | | 409/234 |

FOREIGN PATENT DOCUMENTS

| | | | |
|---|---|---|---|
| DE | 102005054718 A1 * | 5/2007 | ........... B23B 31/028 |
| JP | 2005313257 A | 11/2005 | |
| WO | 2007042020 A2 | 4/2007 | |

OTHER PUBLICATIONS

International Search Report (ISR) and Written Opinion dated Jan. 19, 2017 issued in International Application No. PCT/EP2016/071754.

* cited by examiner (Prior Art)

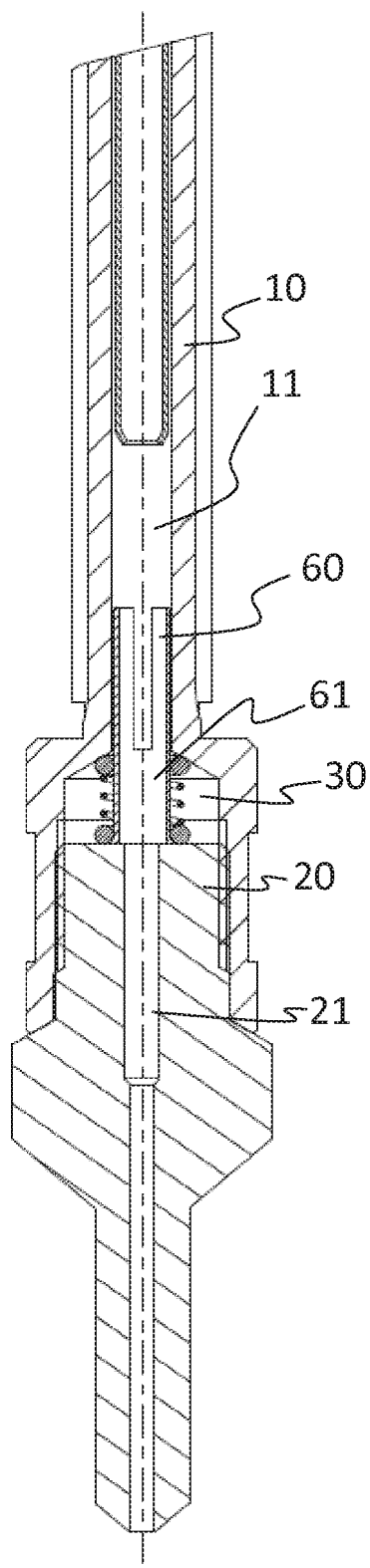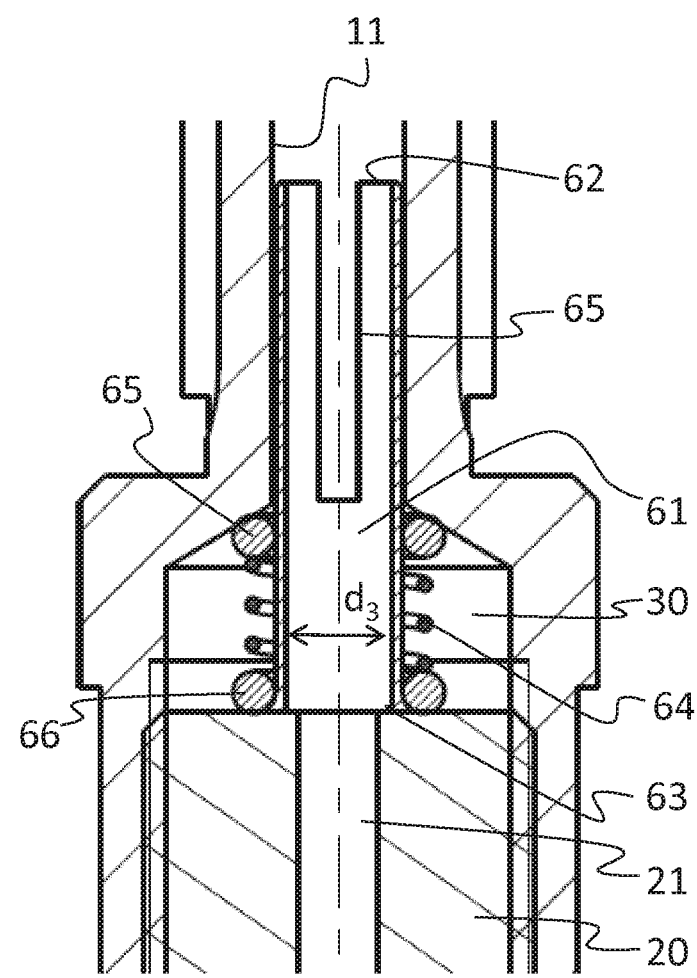
Fig. 7
Fig. 8

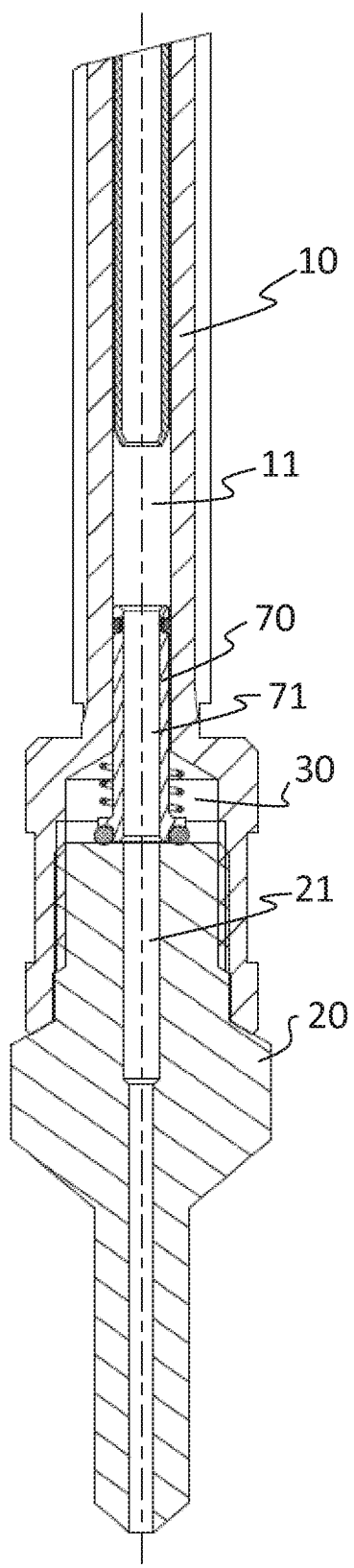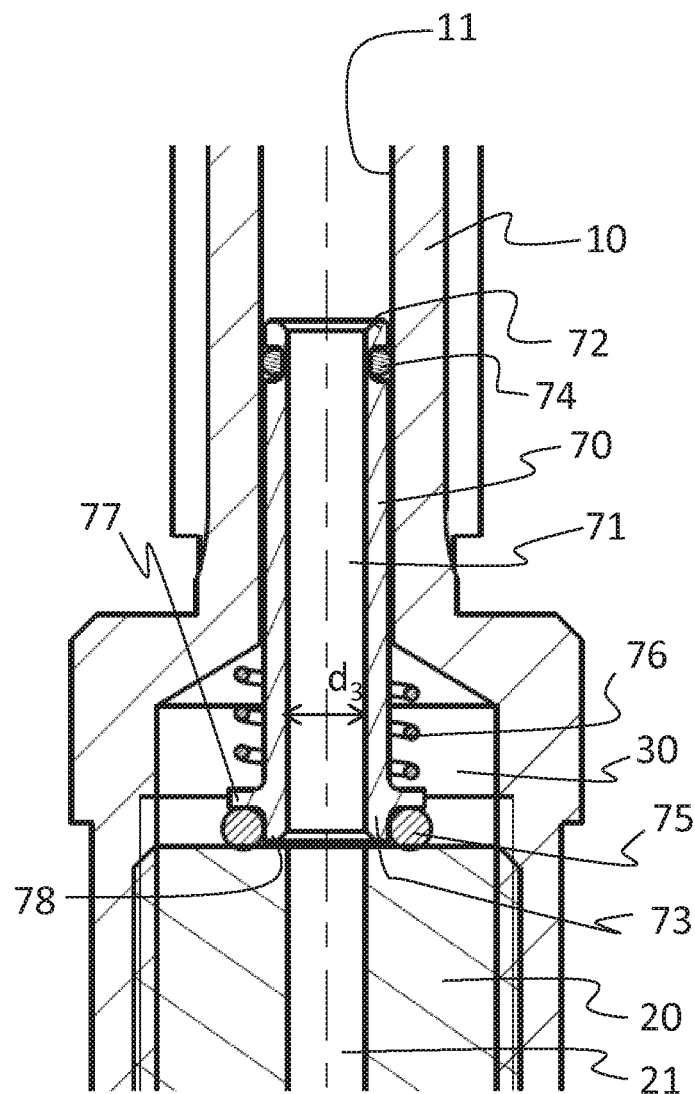
Fig. 9
Fig. 10

POWER TOOL

The invention relates to a spindle for a drilling tool, which spindle is motor driven and connectable to a drill bit of the type that is provided with a fluid, e.g. for continuous cooling and/or lubrication, via the spindle and through its inside.

BACKGROUND

When drilling is performed in hard materials and at high a speed it is customary to provide a fluid for cooling and/or lubrication through the drill bit. Such cooling and lubrication is important to guarantee the quality of the drilling and to minimise the wear of the drilling equipment.

One manner of achieving the cooling and lubrication in a pneumatic tool is to utilise the pressurised air that is provided to the system for driving the motor to produce a mist or fluid from a combination of pressurised air and a lubricator. Another conventional way is to provide a cooling and/or lubrication fluid from an external system. Either way the cooling and/or lubrication fluid is provided through the rotating spindle and into the interior of the drill bit via an interface between the spindle and the drill bit.

A problem with such internal fluid conduction is that it is difficult to control the well function of the cooling and/or lubrication during an on-going drilling operation due to the fact that the front tip of the drill bit at which a mouth of the fluid conduction is hidden inside the bore throughout the operation. Hence, the correct function of the cooling and/or lubrication may only be controlled indirectly by inspection of the bore or by running the drill bit in an open space and/or by inspecting the drill hole after a concluded drilling operation.

A problem that may occur with the fluid conduction is that the provision of fluid may vary over time, such that too much fluid is provided at times and such that too little fluid is provided at other times. A typical problem is that a large amount of fluid is provided at start-up of the machine followed by a phase where too little fluid is provided. At the end of an operation the fluid provision normally has stabilised such that a desired amount of mist is provided through the drill bit.

When too little fluid is provided the precision of the boring may be adventured and the drill bit and work piece may be over-heated. Too much fluid may also have a negative effect on the precision of the boring and further it implies that an excess of fluid will need to be washed away from the work piece.

Hence, there is a need of a drilling tool that does not have the problems of unreliable fluid conduction known in the art.

SUMMARY OF THE INVENTION

An object of the invention is to provide a drilling tool with a reliable and predictable provision lubrication and/or cooling fluid throughout the drilling operation.

This object is achieved by the invention according to claim 1, which relates to a spindle of a drilling tool of the type with a fluid conveyed through the interior of a drill bit to a drilling zone, which spindle is drivable by a motor of the drilling tool, wherein the spindle comprises:
a socket portion for receiving and attaching a drill bit to the spindle, the socket portion having a first axial length of a first diameter adapted to receiving an attachment portion of the drill bit,
a fluid conduit for conveying a fluid to the socket portion, the fluid conduit having a second diameter which second diameter is narrower than the first diameter of the socket portion, wherein the attachment portion has a specific second axial length adapted to be shorter than the specific axial length of the socket portion such that an interface space having the first diameter is formed between the fluid conduit and the drill bit when the drill bit is installed in the socket portion. A fluid conveyor is arranged to connect the fluid conduit to the drill bit, the fluid conveyor having a third diameter which is narrower than the first diameter, so as to avoid that fluid is gathered in a periphery of the interface space between the fluid conduit and the drill bit when the drill bit is installed in the socket portion.

The invention is based on the insight that fluid is trapped in the space between the drill bit and the spindle. The practical solution to the phenomenon as presented by claim 1 appears obvious once this insight has been taken in.

The invention also relates to a drilling tool of the type with a fluid conveyed through the interior of the drill bit to the drilling zone, which drilling tool comprises a spindle as described above.

The invention further relates to a method of installing a drill bit in a spindle of a drilling tool, the spindle comprising:
a socket portion for receiving and attaching the drill bit to the spindle, the socket portion having a first axial length of a first diameter adapted to receiving an attachment portion of the drill bit,
an fluid conduit for conveying a fluid to an opening in the drill bit, the fluid conduit having a second diameter which second diameter is narrower than the first diameter of the socket portion, wherein the attachment portion has a specific second axial length that is shorter than the specific axial length of the attachment portion such that an interface space having the first diameter is formed between the fluid conduit and the drill bit when the drill bit is installed in the socket portion. The method comprises the step of arranging a fluid conveyor to connect the fluid conduit to the opening in the drill bit before or simultaneously as the drill bit is installed, the fluid conveyor having a third diameter, which third diameter is narrower than the first diameter, so as to avoid that fluid is gathered in a periphery of the interface space between the fluid conduit and the drill bit when the drill bit is installed in the socket portion.

Other features and advantages of the invention will be apparent from the detailed description with reference to of the embodiments shown in the figures and from the dependent claims.

SHORT DESCRIPTION OF THE DRAWINGS

In the following detailed description reference is made to the accompanying drawings, of which:

FIG. 7 shows a spindle with an installed drill bit and a fluid conduit according to a third embodiment of the invention arranged in the interface between the spindle and the drill bit;

FIG. 8 is a detailed view of the interface between the spindle and the drill bit in FIG. 7;

FIG. 9 shows a spindle with an installed drill bit and a fluid conduit according to a fourth embodiment of the invention arranged in the interface between the spindle and the drill bit; and FIG. 10 is a detailed view of the interface between the spindle and the drill bit in FIG. 9.

DETAILED DESCRIPTION OF THE SHOWN EMBODIMENTS OF THE INVENTION

Figure 1:
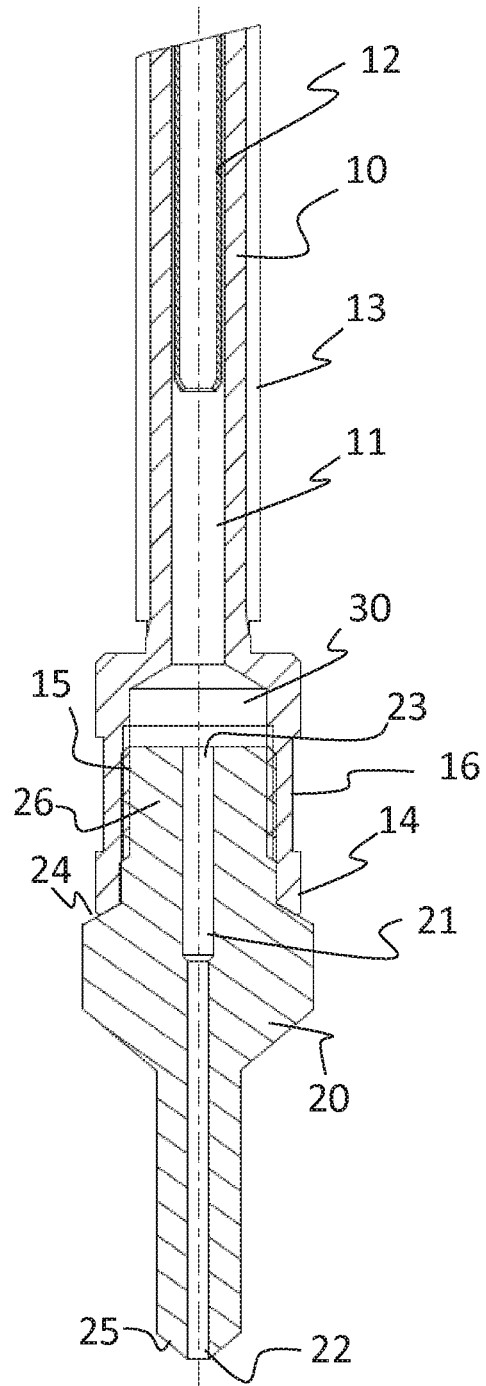
FIG. 1 shows a typical spindle of the prior art with an installed drill bit.
Figure 2:
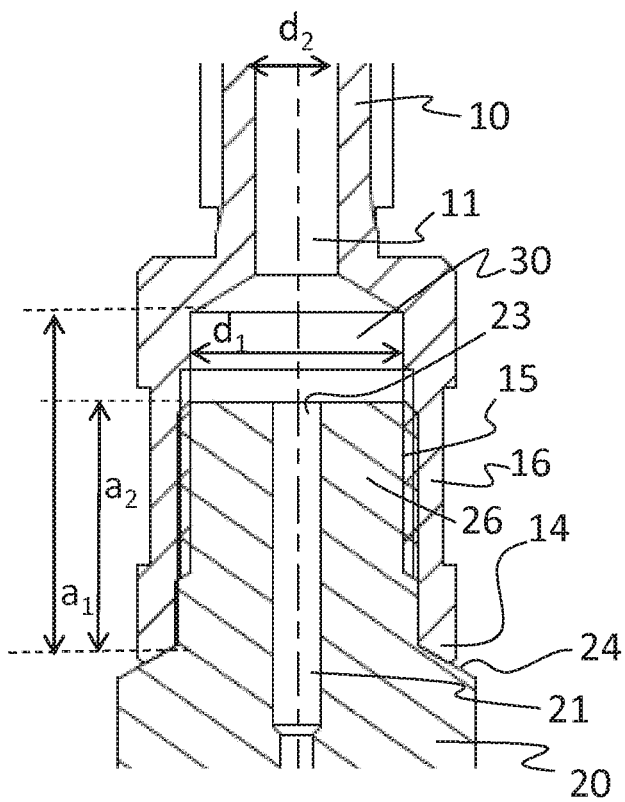
FIG. 2 is a detailed view of an interface between the prior art spindle of FIG. 1 and the installed drill bit.

FIG. 1 shows a typical spindle 10 of the prior art with an installed drill bit 20, and FIG. 2 is a detailed view of an interface space 30 between the spindle 10 and the installed drill bit 20.

The spindle is driven and fed by motor (not shown) via a feed gear (not shown) and a drive gear (not shown) that are connected to the outside of the spindle. For this purpose the outside of the spindle 10 includes a threading 13 configured to mate with the feed gear so as to feed the spindle in a forward direction during a drilling operation. The threading 13 is interrupted by axial splines that are arranged to mate with a drive gear arranged to drive the rotation of the spindle and the installed drill bit 20. In order to drive the spindle forward, the feed gear is set to rotate at a higher rotational speed than the drive gear.

The spindle 10 includes a hollow interior that includes a fluid conduit 11 leading to a socket portion 16 for connection to a drill bit 20. The interior of the socket portion 16 includes a threaded portion 15 for connection to a drill bit 20, which has an outer threading that mates with the threaded portion 15 inside socket portion 16. The outer end 14 of the spindle 10 is configured to abut a contact surface 24 of the drill bit 20. The hollow interior of the spindle 10 is so dimensioned with respect to the drill bit 20 such that an interface space 30 is formed between the outlet of the fluid conduit 11 of the spindle and the inner end drill bit 20.

The fluid conduit 11 of the spindle is arranged to convey a fluid for lubrication and/or cooling of the drill bit 20 and especially for lubrication and/or cooling of the interface between the drill bit and the surface of the work piece into which the drill bit 20 is penetrating during operation. The drill bit 20 comprises a fluid channel 21 with an inlet opening facing the interface space 30 between the spindle 10 and the drill bit 20 when installed inside the spindle, and an outlet opening 22 at an outer tip 25 of the drill bit 20.

Hence, during operation, fluid is provided from a fluid source (not shown) through the fluid conduit 11 inside the spindle 10, via the interface space 30 between the spindle 10 and the drill bit 20 and into the inlet opening 23 of the fluid channel 21 through the drill bit 10 to exit to the drill zone through the outlet opening 22.

The socket portion 16 has a first axial length $a_1$ of a first diameter $d_1$ adapted to receiving an attachment portion 26 of the drill bit 10. The fluid conduit 11 for conveying a fluid to the socket portion 16 has a second diameter $d_2$, which is narrower than the first diameter $d_1$ of the socket portion 16. The attachment portion 26 of the drill bit 20 has a specific second axial length $a_2$ adapted to be shorter than the specific axial length $a_1$ of the socket portion 16 such that a gap or interface space 30 that at least partly is of the first diameter $d_1$ is formed between the mouth of the fluid channel 11 and the drill bit 20 when the drill bit is installed inside the socket portion 16.

Normally, the fluid used for cooling and or lubrication of the drill zone consists of a mist of pressurised air and lubrication liquid such as oil. The invention is based on the notion that the fluid distribution is impeded in that liquid is gathered in the periphery of the interface space 30 due to centrifugal forces created during operation, Typically, the interface space 30 is saturated with liquid during operation. As soon as the interface space 30 is saturated the fluid mist will be conveyed through the fluid conduit 11 of the spindle 10, via the interface space 30 without loss and into the fluid channel 21 through the drill bit 20.

After operation, however, when the spindle no longer rotates the fluid that has been gathered in the interface space may leave the interface space and flow into the fluid channel 21 of the drill bit 20. Liquid that is trapped inside the fluid channel 21 will, when the motor is restarted to set the spindle to rotate simultaneously as the fluid distribution is activated, be blown out of the drill bit as an accumulation of liquid by action of the pressurised mist. Subsequently, a phase will follow in which liquid will re-accumulate in the interface space 30 such that the fluid passing through the fluid channel 21 will mostly consist of air. Hence, in this phase the fluid distribution will be incomplete and the lubrication and/or cooling effect will be insufficient.

This problem of the prior art of unreliable and discontinuous fluid distribution has hence been established to reside in that fluid may gather in the gap in the interface space 30 between the spindle 10 and the drill bit 20. The problem is solved by the inventive fluid conveyor, which is described in four different embodiments below.

Figure 3:
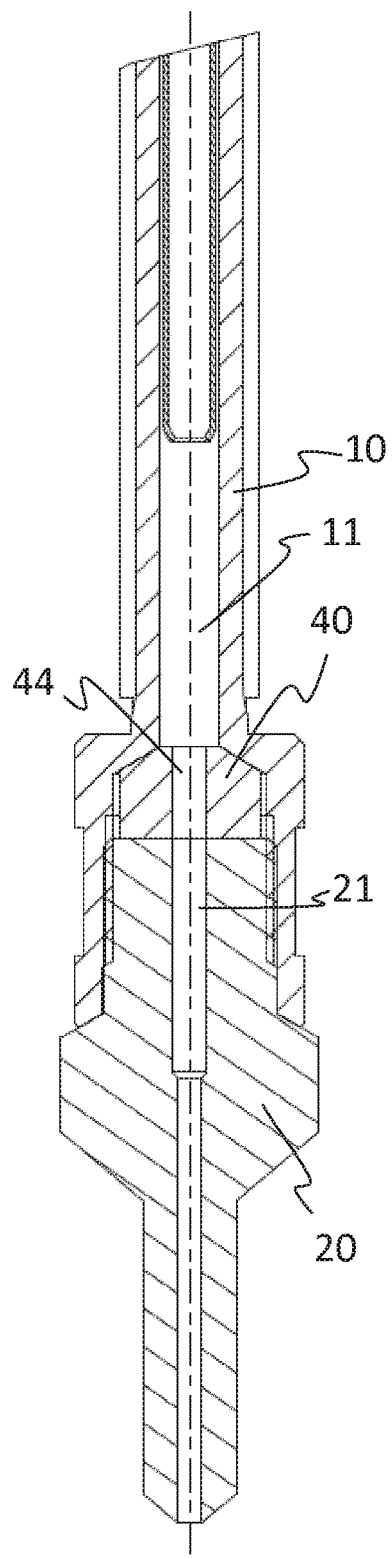
FIG. 3 shows a spindle with an installed drill bit and a fluid conduit according to a first embodiment of the invention arranged in the interface between the spindle and the drill bit.
Figure 4:
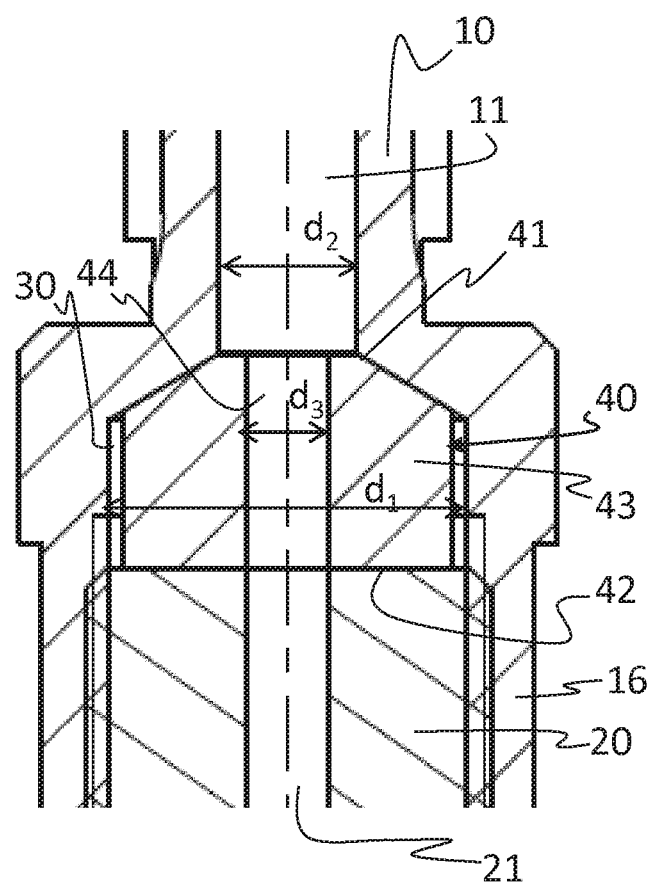
FIG. 4 is a detailed view of the interface between the spindle and the drill bit in FIG. 3.

A first embodiment of the inventive fluid conveyor 40 is shown in FIGS. 3 and 4. This fluid conveyor 40 comprises a gap filling flexible element configured to fill the interface space 30 between the spindle 10 and the drill bit 20 when the drill bit is installed in the spindle 10. The fluid conveyor 40 is advantageously made of an elastic material such as rubber or the like. The material should preferably not be porous so to not allow fluid to gather inside it.

The fluid conveyor 40 is arranged to connect the fluid conduit 11 to the fluid channel 21 of the drill bit. The fluid conveyor 40 has an internal channel 44 of a third diameter $d_3$ that is narrower than the first diameter $d_1$, so as to avoid that fluid is gathered in a periphery of the interface space 30 between the fluid conduit 11 of the spindle 10 and the fluid channel 21 of the drill bit 20 when the drill bit is installed in the socket portion 16. The fluid conveyor 40 is advantageously a separate part that is insertable into the socket portion 16 of the spindle 10.

The fluid conveyer has a shape that is adapted to the shape of spindle 10 and to the size and shape of the drill bit 20 to be inserted into the spindle 10. Spindles may have different shapes and sizes and the fluid conveyer 40 of the first embodiment may therefore have to be individually adapted to a specific spindle and to a range of drill bits. Hence the fluid conveyor 40 comprises a first end 41 that is adapted to fit against the mouth of the fluid conduit 11 of the spindle 10, a second end 42 that is adapted to fit against the mouth of the fluid channel 21 of the drill bit 20, and a body 43 that is adapted to fill the gap there between, i.e. the interface space 30. How these parts are configured is hence dependent on the size and shape of the specific spindle and drill bit with which it is adapted to mate.

Figure 5:
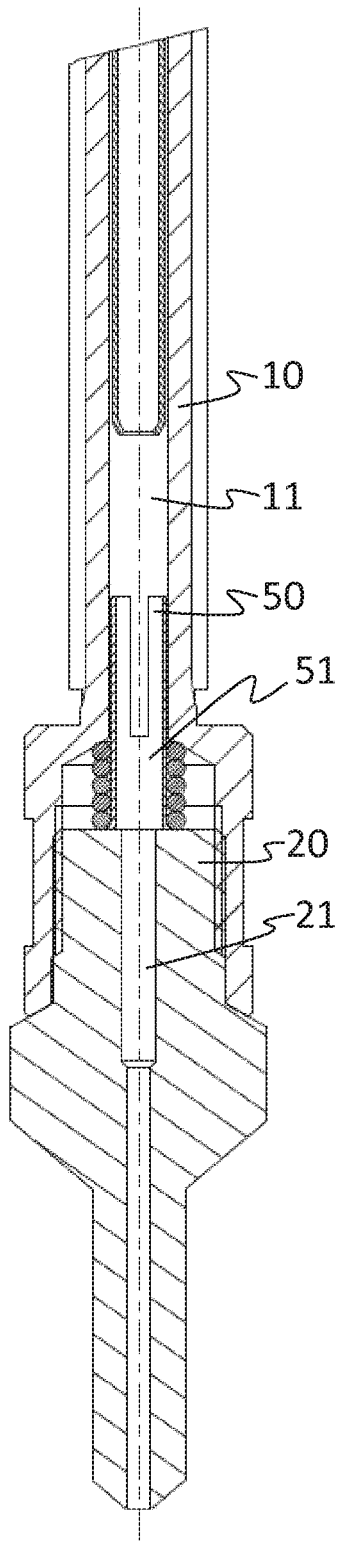
FIG. 5 shows a spindle with an installed drill bit and a fluid conduit according to a second embodiment of the invention arranged in the interface between the spindle and the drill bit.
Figure 6:
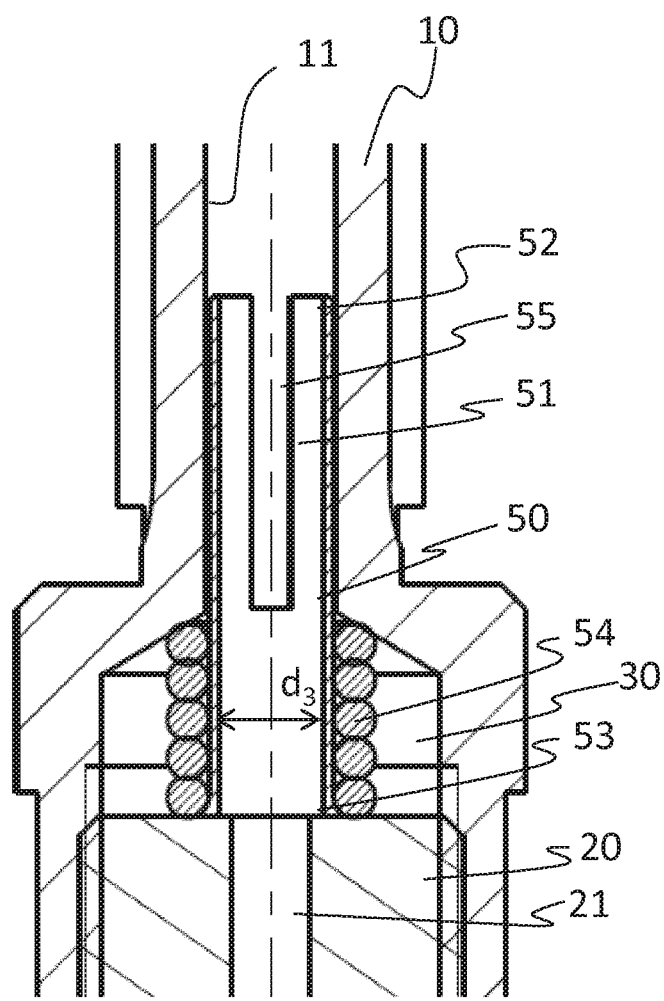
FIG. 6 is a detailed view of the interface between the spindle and the drill bit in FIG. 5.

A second embodiment of the inventive fluid conveyer 50 is shown in FIGS. 5 and 6. This fluid conveyer 50 has the same function as the fluid conveyer 40 according to the first embodiment, i.e. to connect the fluid conduit 11 of the spindle 10 to the fluid channel 21 of the drill bit 20.

The fluid conveyer 50 according to the second embodiment comprises a tubular portion 51 having an inner diameter $d_3$, a first axial end 52 connecting to the fluid conduit 11 of the spindle, and a second axial end 53 configured to abut the drill bit 20 when the drill bit is installed in the socket portion 16 of the spindle 10. The third diameter $d_3$ that is narrower than the first diameter $d_1$ of the interface space 30. The first axial end 52 of the tubular portion 51 is arranged to extend into the fluid conduit 11 of the spindle 10, which is of the second diameter $d_2$.

Further, the fluid conveyer 50 comprises a couple of O-rings 54 arranged to make the connections of the respective ends 52,53 of the tubular portion 51 fluid tight. In the shown embodiment five O-rings are used, but of course the number of O-rings may be adapted to the specific length of the free end of the tubular portion 51, and to the assumed length of the interface space 30. The second axial end 53 includes a rim that is configured to stop the O-ring from sliding off the tubular portion 51.

An advantage of the fluid conveyer 50 according to the second embodiment is that it may be adapted to interface spaces 30 of different lengths, by adding or removing O-rings and let the first axial end 52 of the tubular portion slide farther or shorter into the fluid conduit 11 of the spindle 10. The fluid conveyer 50 further comprises a slit 55, which is arranged to allow fluid that gets trapped between the tubular portion 51 and the inner wall of the fluid conduit 11 of the spindle 10 to re-enter the tubular portion 51 of the fluid conveyer 50.

A fluid conveyor 60 according to a third embodiment is shown in FIGS. 7 and 8. This fluid conveyer 60 connects the fluid conduit 11 of the spindle 10 to the fluid channel 21 of the drill bit 20 via a tubular portion 61. The tubular portion 61 is spring biased by means of a spring 64 towards a position where it extends out of the fluid conduit 11 of the spindle 10. Hence, when a drill bit 20 is arranged inside the socket of the spindle 10 the contact with the drill bit will act against the spring action and push the fluid conveyer 60 further into the fluid conduit 11 of the spindle 10. The tubular portion 61 has a tubular shape of a third diameter $d_3$ that is narrower than the first diameter $d_1$ of the interface space 30. Typically it is narrow enough to fit tightly inside the fluid conduit 11 of the spindle 10, which is of the second diameter $d_2$.

The fluid conveyer 60 according to the third embodiment further comprises a first O-ring 65 arranged to abut the mouth of the fluid conduit 11 of the spindle 10 and a second O-ring 66 arranged to abut the mouth of the fluid channel 21 of the drill bit 20. The spring 64 is arranged between these O-ring 65,66 so as to make sure that the O-rings lie firmly against the respective mouths in order to provide fluid tight connections. The fluid conveyer 60 is provided with a slit 65, with same function as the slit 55 of the second embodiment.

In a similar manner as for the fluid conveyer 50 according to the second embodiment a first axial end 62 of the tubular portion 61 is arranged to extend into the fluid conduit 11 of the spindle 10 to a varying degree depending on the length of the installed drill bit 20. A second axial end 63 of the tubular portion is arranged to abut the drill bit tightly under the action of the spring 64 arranged between the O-rings 65, 66.

A fluid conveyor 70 according to a fourth embodiment is shown in FIGS. 9 and 10. As for the previous embodiments this fluid conveyer 70 connects the fluid conduit 11 of the spindle 10 to the fluid channel 21 of the drill bit 20 via a tubular portion 71 of the fluid conveyer 70. The tubular portion 71 has a tubular shape of a third diameter $d_3$ that is narrower than the first diameter $d_1$ of the interface space 30. Typically it is narrow enough to fit tightly inside the fluid conduit 11 of the spindle 10, which is of the second diameter $d_2$.

The fluid conveyor 70 according to the fourth embodiment resembles the fluid conveyer 60 according to the third embodiment shown in FIGS. 7 and 8. A difference is however that the fluid tight seal against the fluid conduit 11 of the spindle 10 is made inside said fluid conduit 11 by means of an O-ring 74 arranged around a first axial end 72 of the tubular portion 71, which end is configured to extend into said fluid conduit 11. An opposite second axial end 73 of the tubular portion 71 is provided with an O-ring 75 that is configured to provide a fluid tight sealing against the back end of the drill bit 20.

A spring 76 is arranged to push the fluid conveyer 70 towards contact with the drill bit 20. With the fluid conveyor 70 according to the fourth embodiment the shape of the first axial end 72 and the O-ring arranged thereon needs to be adapted within specific tolerances in order to fit tightly inside the fluid conduit 11 of the spindle 10 and to assure a fluid tight connection to said fluid conduit 11.

The O-ring 75 in the second axial end 73 of the fluid conveyer 70 is kept at place by a first circular rim 77 that is arranged so as to push the O-ring to extend axially outside the tip of the second axial end 73. A second circular rim 78 is arranged to keep the O-ring 77 from sliding off the fluid conveyer 70. The second circular rim 78 is less accentuated than the first circular rim 77, and allows for the O-ring to be removed and exchanged over said second circular rim 78.

Above, the invention has been described with reference to specific embodiments. The invention is however not limited to these embodiments.

The embodiments described above are all easily installed and removed from inside the drill bit. In some applications it may however be advantageous to arrange the fluid conveyer in a more fixed manner, such that it will remain seated when the drill bit is exchanged for another drill bit. For instance, the fluid conveyer may be fixed part of the spindle, or it may be arranged so as to be locked inside the spindle. A thread connective rim (not shown) may be configured to lock the fluid conveyor axially with respect to the spindle by interaction to the threaded portion 15 of the socket portion 16. A tubular portion of the fluid conveyer may be spring biased with respect to the thread connective rim so as to push an end of the tubular portion towards interaction with the drill bit.

Further, it is obvious to a person skilled in the art that the invention comprises further embodiments, which are either a combination of the embodiments above or other embodiments within the invention's scope of protection as defined by the following claims.

The invention claimed is:
1. A spindle of a drilling tool wherein a fluid is conveyed through an interior of a drill bit to a drilling zone, the spindle, drivable by a motor of the drilling tool, comprising:
   a socket portion for receiving and attaching a drill bit to the spindle, the socket portion having a first axial length (a1) of a first diameter (d1) and being adapted to receive an attachment portion of the drill bit; and a fluid conduit for conveying a fluid to the socket portion, the fluid conduit having a second diameter (d2) narrower than the first diameter (d1) of the socket portion, wherein:
the attachment portion has a second axial length (a2) shorter than the first axial length (a1) of the socket portion such that an interface space having the first diameter (d1) is formed between the fluid conduit and the drill bit when the drill bit is installed in the socket portion,
a fluid conveyor is arranged to connect the fluid conduit to the drill bit, the fluid conveyor having a third diameter (d3) narrower than the first diameter (d1) of the socket portion, and the fluid conveyor being configured to prevent fluid from gathering in a periphery of the interface space formed between the fluid conduit and the drill bit when the drill bit is installed in the socket portion,
the fluid conveyor comprises a first O-ring arranged to abut a mouth of the fluid conduit of the spindle and a second O-ring arranged to abut a mouth of a fluid channel of the drill bit, and
a spring is arranged between the first O-ring and the second O-ring, so as to ensure that the O-rings lie firmly against the respective mouths of the fluid conduit of the spindle and the fluid channel of the drill bit, to provide fluid tight connections at the respective mouths.

2. The spindle of claim 1, wherein the fluid conveyor is a separate part insertable into the socket portion of the spindle.

3. The spindle of claim 2, wherein the fluid conveyor comprises a tubular portion partly insertable into the fluid conduit of the spindle, the tubular portion having a first axial end configured to extend into the fluid conduit and a second axial end configured to abut the drill bit when the drill bit is installed in the socket portion.

4. The spindle of claim 3, wherein the first axial end is provided with an external O-ring configured to provide a fluid tight connection to an inside of the fluid conduit.

5. The spindle of claim 4, wherein the second axial end is provided with an external O-ring configured to provide a fluid tight connection to the drill bit when the drill bit is installed in the socket portion.

6. A drilling tool, wherein a fluid is conveyed through an interior of a drill bit to a drilling zone, comprising the spindle according to claim 4.

7. The spindle of claim 3, wherein the second axial end is provided with an external O-ring configured to provide a fluid tight connection to the drill bit when the drill bit is installed in the socket portion.

8. A drilling tool, wherein a fluid is conveyed through an interior of a drill bit to a drilling zone, comprising the spindle according to claim 7.

9. A drilling tool, wherein a fluid is conveyed through an interior of a drill bit to a drilling zone, comprising the spindle according to claim 3.

10. A drilling tool, wherein a fluid is conveyed through an interior of a drill bit to a drilling zone, comprising the spindle according to claim 2.

11. The spindle of claim 1, wherein the fluid conveyor comprises a tubular portion partly insertable into the fluid conduit of the spindle, the tubular portion having a first axial end configured to extend into the fluid conduit and a second axial end configured to abut the drill bit when the drill bit is installed in the socket portion.

12. The spindle of claim 11, wherein the first axial end is provided with an external O-ring configured to provide a fluid tight connection to an inside of the fluid conduit.

13. The spindle of claim 12, wherein the second axial end is provided with an external O-ring configured to provide a fluid tight connection to the drill bit when the drill bit is installed in the socket portion.

14. A drilling tool, wherein a fluid is conveyed through an interior of a drill bit to a drilling zone, comprising the spindle according to claim 13.

15. A drilling tool, wherein a fluid is conveyed through an interior of a drill bit to a drilling zone, comprising the spindle according to claim 12.

16. The spindle of claim 11, wherein the second axial end is provided with an external O-ring configured to provide a fluid tight connection to the drill bit when the drill bit is installed in the socket portion.

17. A drilling tool, wherein a fluid is conveyed through an interior of a drill bit to a drilling zone, comprising the spindle according to claim 16.

18. A drilling tool, wherein a fluid is conveyed through an interior of a drill bit to a drilling zone, comprising the spindle according to claim 11.

19. A drilling tool, wherein a fluid is conveyed through an interior of a drill bit to a drilling zone, comprising the spindle according to claim 1.

20. A method of installing a drill bit in a spindle of a drilling tool, the spindle comprising:
a socket portion for receiving and attaching a drill bit to the spindle, the socket portion having a first axial length (a1) of a first diameter (d1) and being adapted to receive an attachment portion of the drill bit; and
a fluid conduit for conveying a fluid to an opening in the drill bit, the fluid conduit having a second diameter (d2) narrower than the first diameter (d1) of the socket portion,
wherein the attachment portion has a second axial length (a2) shorter than the first axial length (a1) of the socket portion such that an interface space having the first diameter (d1) is formed between the fluid conduit and the drill bit when the drill bit is installed in the socket portion,
the method comprising arranging a fluid conveyor to connect the fluid conduit to the opening in the drill bit before or simultaneously as the drill bit is installed,
wherein:
the fluid conveyor has a third diameter (d3) narrower than the first diameter (d1) of the socket portion,
the fluid conveyor comprises a first O-ring arranged to abut a mouth of the fluid conduit of the spindle and a second O-ring arranged to abut a mouth of a fluid channel of the drill bit, and
a spring is arranged between the first O-ring and the second O-ring, so as to ensure that the O-rings lie firmly against the respective mouths of the fluid conduit of the spindle and the fluid channel of the drill bit, to provide fluid tight connections at the respective mouths,
the fluid conveyor is configured to prevent fluid from gathering in a periphery of the interface space formed between the fluid conduit and the drill bit when the drill bit is installed in the socket portion.

* * * * *

UNITED STATES PATENT AND TRADEMARK OFFICE
CERTIFICATE OF CORRECTION

| | | |
|---|---|---|
| PATENT NO. | : 10,543,540 B2 | Page 1 of 1 |
| APPLICATION NO. | : 15/762078 | |
| DATED | : January 28, 2020 | |
| INVENTOR(S) | : Patrik Leander Andersson | |

It is certified that error appears in the above-identified patent and that said Letters Patent is hereby corrected as shown below:

On the Title Page

In item (73) change "Tokyo (JP)." to -- Stockholm (SE) --.

Signed and Sealed this
Twenty-eighth Day of July, 2020

Andrei Iancu
*Director of the United States Patent and Trademark Office*